June 28, 1960
B. P. E. LEVEL
2,943,173
CIRCUIT-BREAKER, AND ESPECIALLY A COMBINED
CIRCUIT-BREAKER ISOLATING-SWITCH DEVICE
Filed Feb. 27, 1958
5 Sheets-Sheet 1
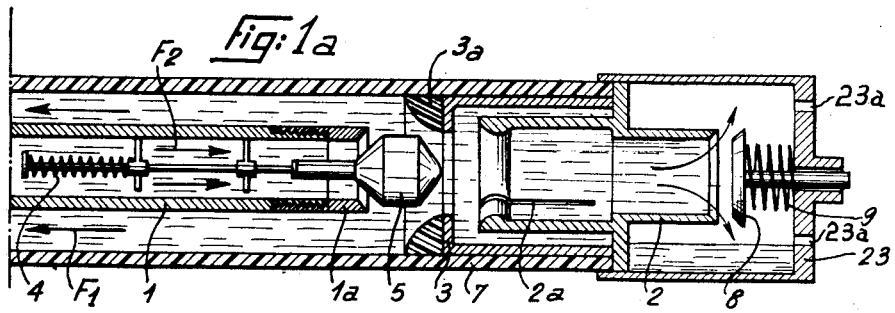
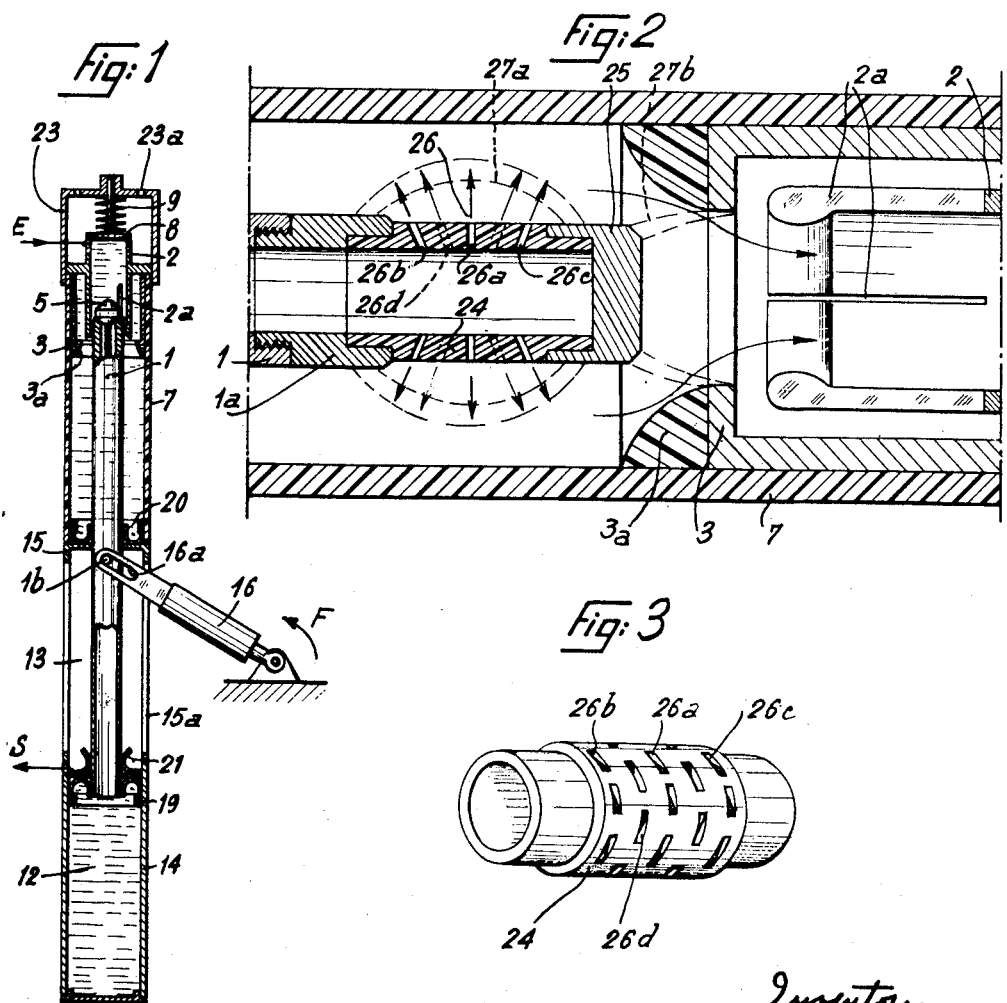

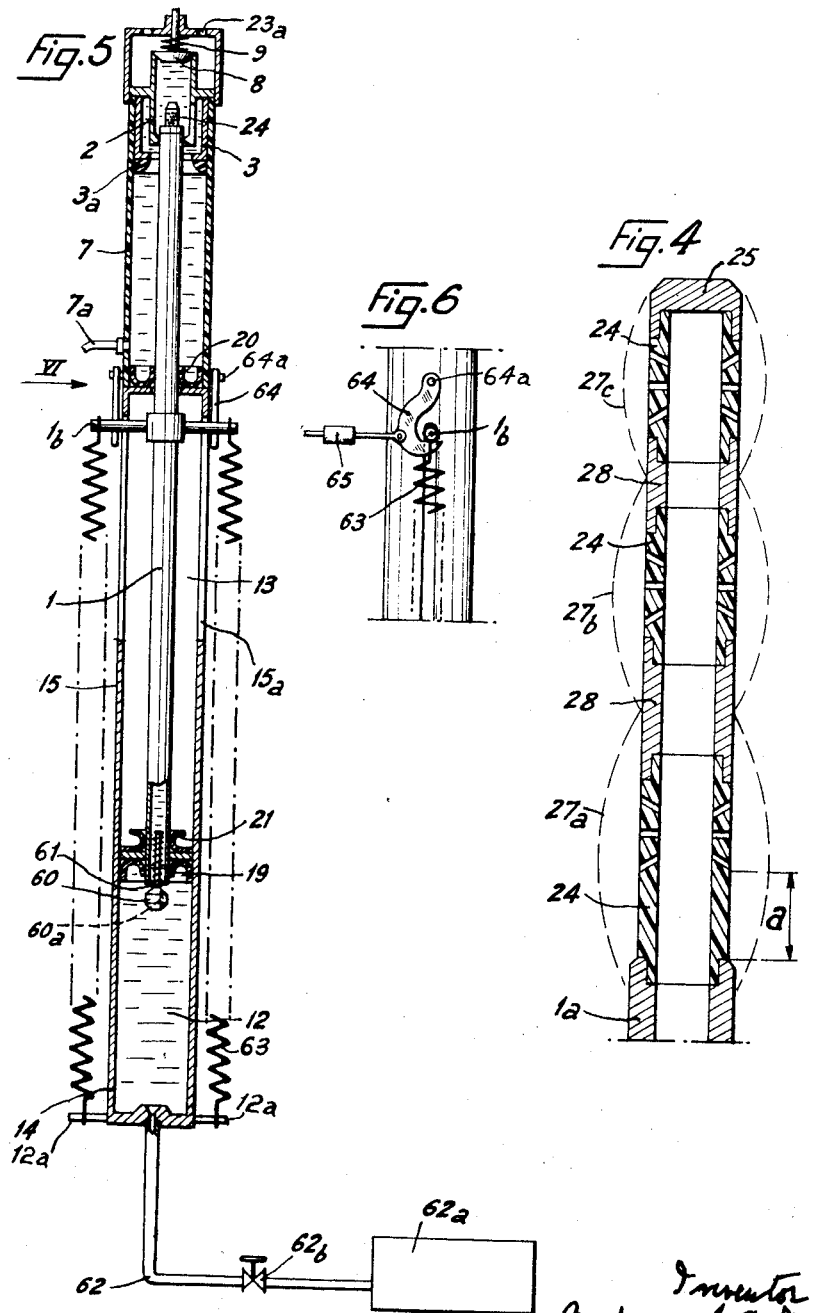

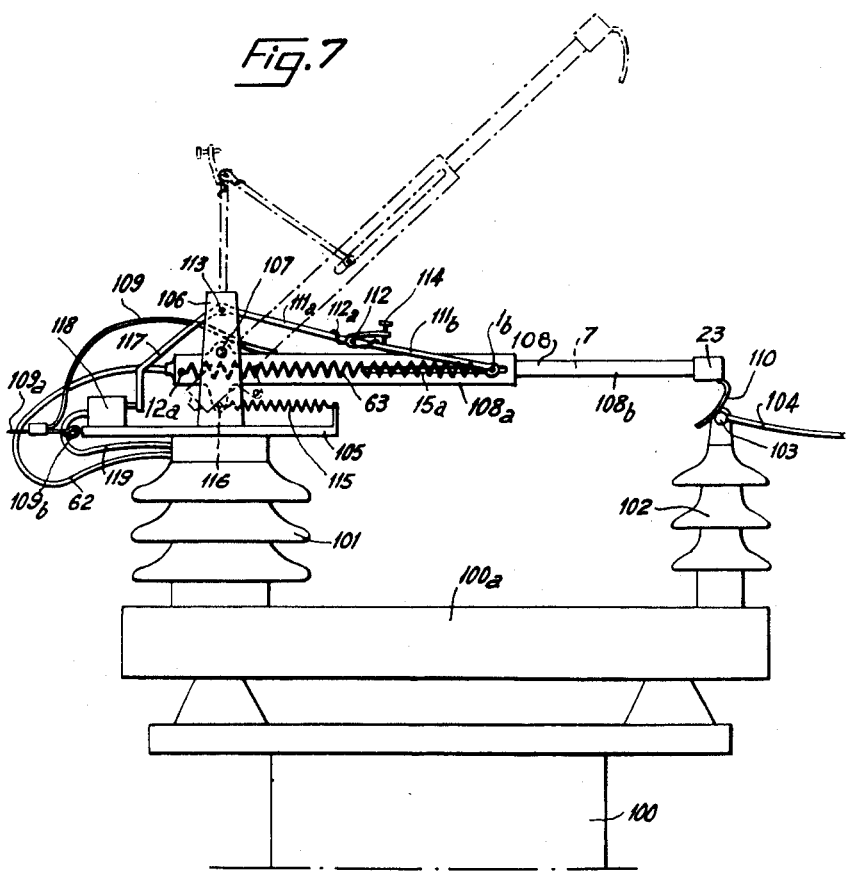
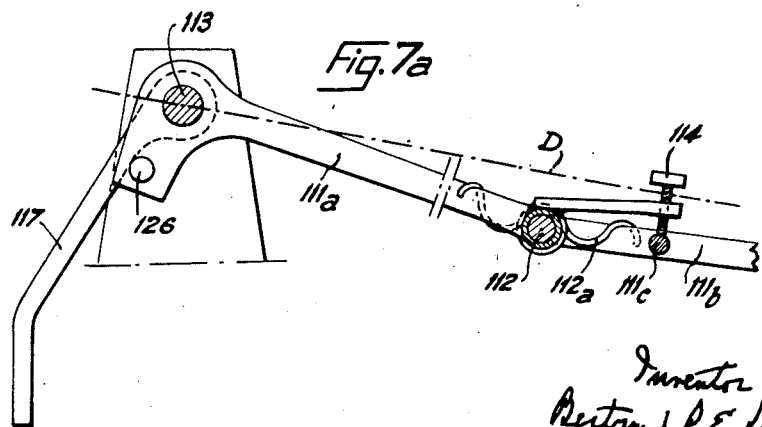

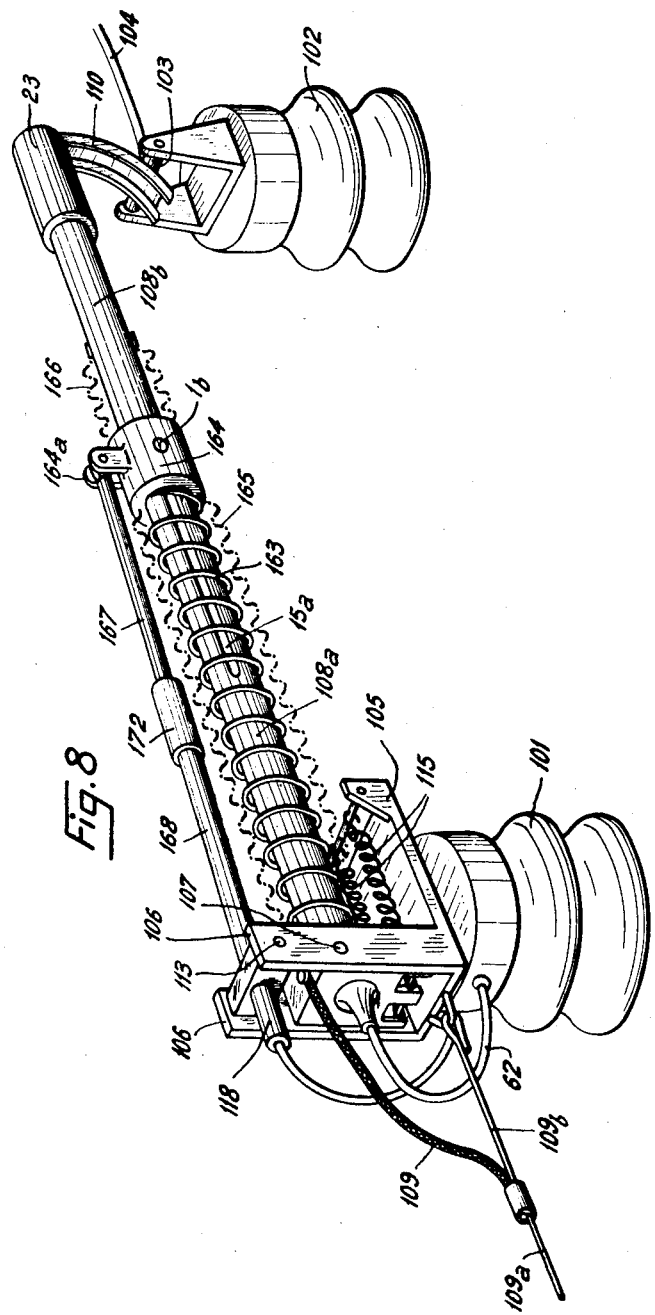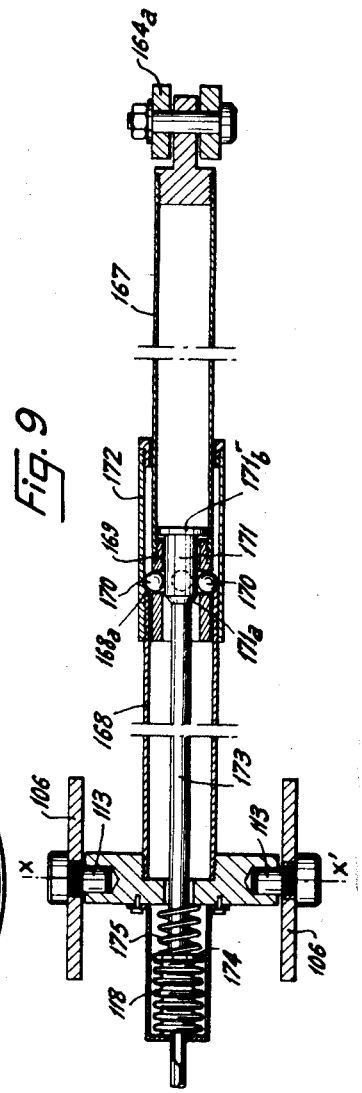

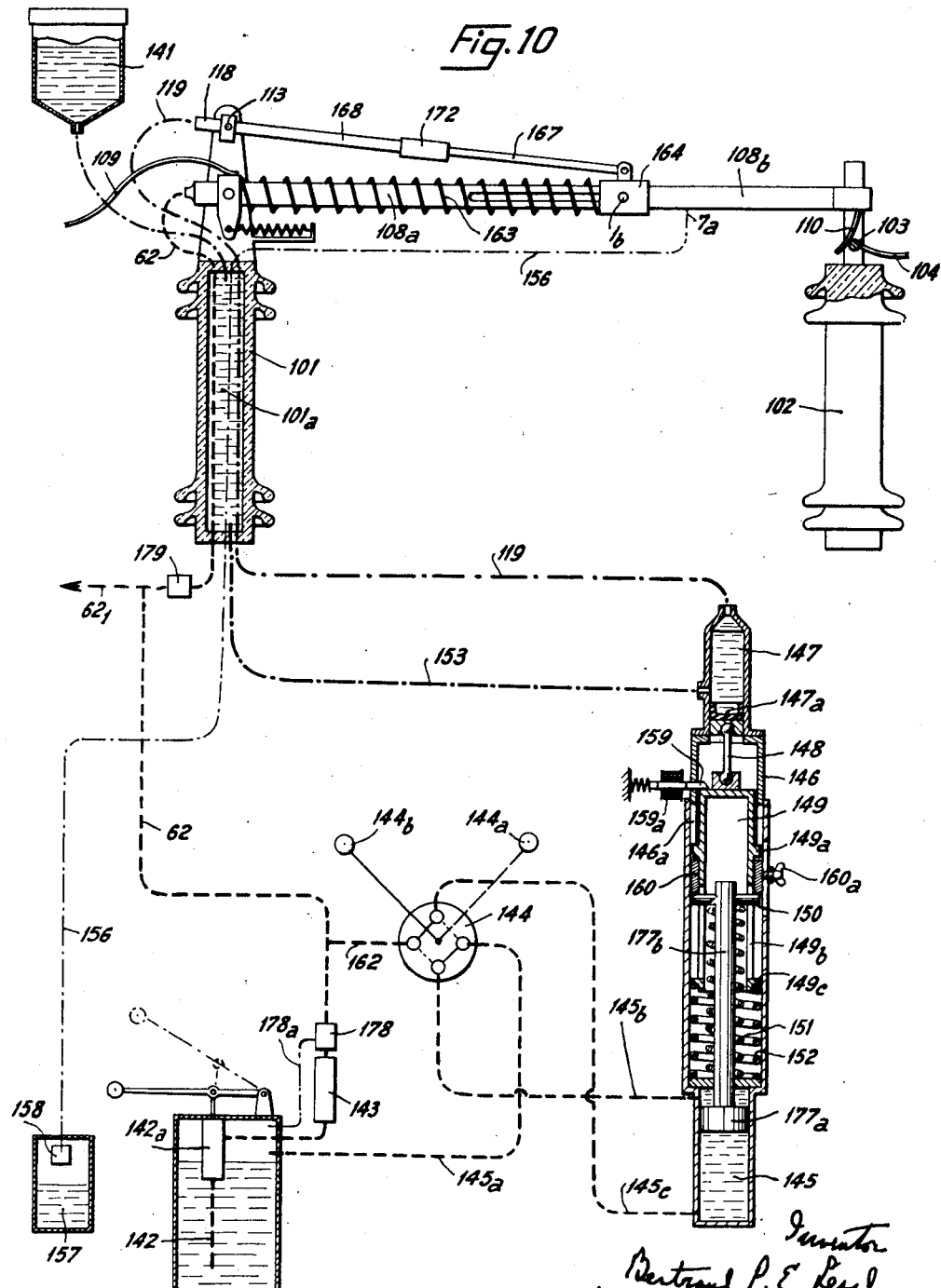

United States Patent Office 2,943,173
Patented June 28, 1960

2,943,173

CIRCUIT-BREAKER, AND ESPECIALLY A COMBINED CIRCUIT-BREAKER ISOLATING-SWITCH DEVICE

Bertrand P. E. Level, 6 bis Ave. de la Prise d'Eau, Le Vesinet, France

Filed Feb. 27, 1958, Ser. No. 717,895

Claims priority, application France Mar. 1, 1957

19 Claims. (Cl. 200—150)

It is well known that in electric energy-distribution networks, two very different types of apparatus are employed to isolate circuits from each other. Devices of the one type, known as isolating switches, have practically no breaking capacity and must be exclusively operated when not under load. They comprise moving arms, the function of which is to effect the separation of circuits by a visible discontinuity, which enables work to be carried out in safety on the parts of the circuit thus separated. Devices of the other type, known as circuit-breakers, comprising high-speed moving contacts and blowing devices for extinguishing arcs are, on the other hand, capable of breaking high current intensities, not only those which correspond to the normal current, but those which may be produced at the moment of a short-circuit.

Any connection of a large installation generally comprises, for this reason, a circuit-breaker preceded and followed by series-connected isolating-switches. In addition, the operation of these devices is interlinked in such manner that it is never possible to open an isolating switch on load, which would be a very dangerous operation because of the uncontrolled arcs which are produced.

It has already been proposed to combine a circuit-breaker and an isolating-switch in a single apparatus, each of the arms of the isolating-switch being constituted by light circuit-breaker devices. In such combined apparatus, the rupture of the current is effected in the first place by means of the circuit-breaker devices, after which the arms removed to make visible the break which has been effected.

The present invention has for its object improvements in combined circuit-breaker isolating-switch apparatus having essentially the purpose of improving the breaking capacity of the circuit-breaker portion and to make automatic the conjugation of the movements of the circuit-breaker portion and the isolating-switch portion, both during opening and during closing.

The light circuit-breakers used in this kind of combined apparatus generally comprise a moving tubular contact engaged, in the closed position, in a fixed contact which is also tubular, the separation of the moving contact and the fixed contact causing an extinguishing fluid to be passed through the said tubular moving contact, so as to extinguish the arc which appears between these contacts during their separation.

In accordance with a special feature of the invention, the fixed contact and the corresponding extremity of the tubular moving contact are enclosed in a chamber filled with oil and closed by a calibrated valve, this chamber communicating through the internal channel of the moving contact, with a second chamber which is practically closed and forms a reserve of oil, in which the other extremity of the moving contact penetrates in the same way as a plunger piston.

Thus, displacement of the moving contact causes the intake, through the internal channel of this contact, of the oil required for blowing out the arc which forms between the fixed contact and the moving contact, whilst the calibrated valve allows the escape of the gases and vapours produced by the heat of the arc, while maintaining a pressure favourable to the extinction of this arc in the first chamber.

The extremity of the moving contact which is turned towards the fixed contact is preferably arranged so as to force outwards the tubular arc which is formed between these contacts, to divide it up and to increase the quantity of oil coming into contact with this arc in order to accelerate its cooling.

In a preferred form of embodiment of this circuit-breaker, which especially permits of the re-closing of the circuit-breaker by hydraulic means, the oil-reserve chamber communicates with a source of oil under pressure, and the moving tubular contact is urged in the direction of opening by a restoring spring, whilst this tube terminates in the reserve chamber by a valve subjected to the action of a second spring of lower strength than the first, the head of which projects beyond the extremity of the tube and can come into contact with the inner wall of the said reserve chamber.

Thus, when the circuit-breaker is opened, the valve in contact with the wall of the reserve chamber is closed by the difference in power of the springs, and oil under pressure sent into this reserve chamber keeps the valve closed and allows the tubular moving contact to move against the force of its restoring spring towards the position of closure of the contacts, until the moving contact and the fixed contact are brought into engagement and are locked in this position.

Thereafter, a fall in pressure in the reserve chamber allows the valve to open, so that the circuit-breaker is then in the set position; it is then in fact only necessary to free the interlock holding the tubular moving contact engaged in the fixed contact, for the return spring to ensure the opening of the circuit-breaker and the passage of oil into the break chamber.

In addition, when the valve is open, an additional quantity of oil sent under pressure into the reserve chamber can serve to renew the oil in the break chamber, the excess oil from this latter chamber being discharged through the calibrated valve which closes it, or through a small orifice formed in this break chamber. An orifice of this kind is sufficient for the outflow of used oil from the break chamber, and does not interfere with the working of the circuit-breaker during its opening.

It is thus possible to use break chambers having a very small volume, in which the oil is renewed after each break.

A circuit-breaker of this kind thus takes the form of an elongated tubular member comprising a break chamber at one extremity and the oil-reserve chamber at the other and, between these two chambers, an intermediate hollow portion which permits the coupling of the tubular internal moving contact with the external return spring.

An elongated member of this kind lends itself particularly well to form an arm of an isolating switch which can be pivoted on the reserve chamber side, whilst the fixed tubular contact located on this elongated member, on the opposite side, projects beyond the latter and co-operates with a fixed contact and by a rocking movement of this elongated member may be moved away from the said fixed contact.

In this case, the interlocking member of the moving contact is formed by an extensible element, rigid in its position of maximum extension, which is pivoted on the one hand on the moving contact inside the arm, and on the other hand on the support carrying the articulation of this arm, along an axis parallel to that of this articulation but situated beyond this latter.

An extensible element of this kind may be constituted by a knuckle-joint which locks itself automatically in its position of maximum extension, or by a telescopic tube provided with a locking device in its positon of maximum extension.

Thus, starting from the open position (with the arm swung out and the circuit-breaker opened), the application of oil pressure to the reserve chamber by displacing the moving contact stresses the return spring and stretches the extensible element up to its maximum length, which closes the circuit-breaker; after which a fall in the pressure of oil in the reserve chamber enables the return spring to shorten itself slightly, which has the effect of causing the arm to be swung about its pivot towards the fixed contact (closure of the isolating-switch) by reason of the rigidity of the locking element.

With a suitable displacement of the pivotal axes of the arm and of the locking member, and a powerful return spring, the automatic closing couple of the isolating-switch, which appears as soon as the drop in pressure occurs in the reserve chamber, may be as great as may be desired.

In consequence, it is possible to subject the arm continously to an opposing couple of smaller value acting continuously in the direction of opening and having a lower value than the closing couple.

This opening couple is supplied with advantage by a second return spring acting directly on the arm and reduces the abruptness of the closure movement of this arm in addition to which it permits of the automatic opening of the arm after that of the circuit-breaker which it contains.

In fact, by reason of the strength of the first return spring, as soon as the locking element is freed, the contact-breaker opens whilst the arm remains stationary due to its inertia; as soon as the contact-breaker has opened, the closure couple disappears and the second return spring acts in its turn in the direction of opening of the arm.

It can thus be seen that by the single action of a source of hydraulic pressure, there is obtained automatically and in succession, the closure of the circuit-breaker and then the swing back of the arm, that is to say the closure of the isolating-switch, whilst the liberation of the extensible element to permit of its shortening also effects the opening of the circuit-breaker in an automatic manner, followed by the swinging of the arm, that is to say the opening of the isolating switch.

It has already been shown that the operation of closure is obtained, after having supplied oil under pressure to the reserve chamber, by momentarily putting this chamber under depression.

When the device is re-closed however, it may happen that the cause which has led to its opening, a short-circuit for example, has not disappeared, so that as soon as the device is re-closed it will again open. Now, at this moment, the reserve chamber is being emptied. Due to this fact, the return movement of the moving contact may expel the oil from this reserve chamber, so that the arc-extinguishing effect cannot take place.

In order to remedy this drawback, so as to cause the arm to be closed, the reserve chamber is put into communication with a reservoir, the volume of which is limited to that of the oil which is expelled from the reserve chamber by the recoil effect of the first return spring when the arm swings about its pivot.

Thus, even in the case of a re-closure on a short-circuit, the circuit-breaker can operate normally.

The accompanying drawings will permit of a clear understanding of the manner in which the invention can be carried into effect.

Fig. 1 is a longitudinal cross-section of a simple circuit-breaker.

Fig. 1a is an enlarged detail of Fig. 1.

Fig. 2 is a cross-section similar to Fig. 1a, showing an alternative form of construction of the moving part of the circuit-breaker.

Fig. 3 is a perspective view of a detail of Fig. 2.

Fig. 4 shows a further alternative form of construction of the extremity of the moving contact of a circuit-breaker.

Fig. 5 is a longitudinal cross-section of a construction of circuit-breaker provided with a hydraulic setting control.

Fig. 6 is a detail view taken in the direction of arrow VI of Fig. 5.

Fig. 7 is an elevation view of a circuit-breaker isolating-switch device.

Fig. 7a is an enlarged detail of Fig. 7.

Fig. 8 shows in perspective an alternative form of circuit-breaker isolating-switch.

Fig. 9 is an enlarged detail of the extensible device used in the construction shown in Fig. 8.

Fig. 10 is a general diagram of the control system of a circuit-breaker isolating-switch.

As can be seen from Fig. 1, an oil-break circuit-breaker comprises a moving contact formed by a metal tube 1, the extremity of which is engaged in a fixed contact 2, which is also of tubular form and is terminated by resilient gripping jaws. These jaws are produced by providing this fixed contact with longitudinal slots 2a (see Fig. 1a). The two contacts are enclosed in an insulating cylindrical chamber 7, filled with a dielectric oil, which in the closed position of the contacts communicates with the interior of the metal tube 1 by means of the slots 2a.

The chamber 7 is closed by a calibrated valve 8 compressed by a spring 9, the whole being arranged in a chamber 23 pierced with orifices 23a communicating with the atmosphere so as to permit the escape of the vaporised oil at the moment of the break. The fixed contact 2 is doubled by an arc-arrester 3 of annular shape, arranged along the inner wall of the chamber 7, which is connected to the rear conducing portion of the contact 2. An insulating ring 3a is mounted in front of the arc-arrester 3. This serves on the one hand to guide the moving contact towards the fixed contact owing to the bell-mouth opening of this ring 3a, and on the other hand to accelerate the speed of the oil in the vicinity of the arc-arrester 3.

In addition the chamber 7, the circuit-breaker comprises a second chamber 12, also filled with oil, forming an oil reserve chamber. The chamber 12 comprises a cylindrical wall 14 of metal, which is extended by a tubular portion 15 hollowed out in 15a to permit the passage of the insulating control rod 16. This connecting rod is coupled to the tube 1 by the forked member 16a provided with elongated openings which are engaged on nipples 1b carried by the tube 1.

The fluid-tight joints 19 and 20 force the oil to flow from one chamber to the other, passing through the interior of the tube 1, during the longitudinal movement of the said tube 1.

As fully explained later, for breaking the circuit, the end of the tube 1 engaged in the fixed contact 2 longitudinally slides in the chamber 7 until said end is closed to the joint 20 for obtaining the largest possible distance between the separated contacts. The length of the hollowed tubular portion should consequently be at least equal to the travel of the tube 1 and, furthermore, the length of the chamber 12 in which remains the opposite end of the tube is also at least equal to said travel. In other words, the tubular casing 7, 15, 14 comprises broadly three portions of substantially equal lengths, the first being of insulating material and the two others of conducting material.

The input terminal E of the current is coupled to the fixed contact 2, whilst a rubbing contact 21, coupled to the output terminal S enables a conductive coupling to be made with the tube 1 in all the positions of this tube.

In Figs. 1 and 1a, the extremity of the tube 1 which is directed towards the fixed contact 2 is provided with a mushroom-shaped insulating deflector 5 which is intended to spread out the jet of oil passing out of the extremity of this tube into a conical sheet.

The deflector may be fixed to the extremity of the tube 1 through the intermediary of an arc-arrester 1a. As shown in Fig. 1a, this deflector is preferably mounted in the same way as a valve at the extremity of the tube 1, and is subjected to the action of a spring 4. Thus, in the closed position of the circuit-breaker, the deflector 5 closes the extremity of the tube 1 whilst during the recoil of the tube 1 (arrows $F_1$), this valve is opened by the incoming oil (arrows $F_2$).

A deflector of this kind forming a valve has the advantage of preventing the oil which has been carbonised in the chamber 7 by the break of the arc from being mixed with the fresh oil contained in the reserve chamber 12. In addition, in the case of any leakage from the reserve chamber 12, this valve keeps the chamber 7 filled with oil.

The extremity of the tube 1 which is directed towards the fixed contact may also be arranged as shown in Fig. 2.

The conducting tube 1 is terminated by an arc-arrester ring 1a made of metal having satisfactory resistance to arcing, for example of stainless steel, and it is extended by an insulating tube 24 which is closed in the direction of the fixed contact by a conducting plug 25 which is also of arc-resisting metal.

The tube 24 is provided with orifices 26 for the passage of oil to the chamber 7 at the moment of separation of the contacts 1 and 2. These orifices are preferably slots milled in the wall of the insulating tube.

The arc-arrester 1a, the tube 24 and the plug 25 have a diameter slightly less than that of the tube 1, so as to permit a free communication of the chamber 7 with the tube 1.

In the central part of the tube 24 (see Fig. 2), the slots 26a may be arranged in planes perpendicular to the axis of the tube 24, whilst towards the extremity of this tube, the slots such as 26b and 26c may be arranged along conical layers which are oppositely orientated with respect to the axis of the tube 24.

In addition, as shown in Fig. 3, the various orifices are preferably arranged in staggered relation at the periphery of the tube 24, so that all the generator lines of the cylindrical tube 24 are interrupted at least once by a slot.

Finally, the slots of two consecutive series, such as 26b and 26d in Fig. 2 and 3 have preferably and in addition, oblique orientation with respect to the radial direction, in order that the jets of oil discharged from these slots do not pass out at right angles to the wall of the tubes 24, but obliquely, thus initiating whirling movements of the oil around the tube 24, these movements having opposite directions of rotation for two consecutive series of slots.

In the position shown in Fig. 1, the circuit-breaker is closed. Its opening is effected by a pivotal movement in the direction of the arrow F of the control rod 16 which is itself coupled to a device, not shown, of known type, adapted to give a pivotal movement of high speed to the rod in both directions.

As the tube 1 moves from top to bottom, its lower extremity forms a plunger piston which forces a quantity of oil equal to its volume from the reserve chamber 12 into the break-chamber 7, through the interior of the tube 1.

If the section of the tube 1 is constant over its whole length, the pressure forces which are applied to the tube in the two chambers are equal and of opposite direction. Their resultant is therefore zero, so that the operation of the rod 16 has only the frictional resistances to overcome.

When the tube 1 is separated from the fixed contact 2, an arc is struck first of all between the two contacts 1 and 2. If this arc is not rapidly extinguished at the moment when the conducting plug 25 passes out of the fixed contact, this arc establishes itself, on the one hand, on this intermediate conductor 25 and, on the other hand, on the arc-arrester 3. In addition, the arc is extended between the plug 25 and the arc-arrester 1a. Thus, the arc is divided into two parts, 27a and 27b.

The arc 27 forms in the oil around the contacts a bubble of gas in the form of a sleeve, in which the oil arrives in a conical layer (the case of Fig. 1a) or in small drops passing out of the slots 26a to 26b (the case of Fig. 2). In the first case, the conical layer of oil sweeps away the arc; in the second case, by reason of the oblique direction in contrary senses of the jets of oil discharged from the slots, there is produced a vortex stirring action of the small drops in the said bubble, so that a large quantity of oil comes into contact with the arc so as to cool it by partial vaporisation of this oil. In addition, the axial direction of the slots ensures an outward movement of the arc over the whole length of its periphery.

Under the vapour pressure thus obtained, oil tends to escape through the inner channel of the fixed contact 2, by forcing the opening of the valve 8, so that an extinguishing effect by sweeping with oil is also obtained on the part 27b of the arc when the breaking of the current cannot be obtained by the single extinction of the arc which strikes initially between the arc-arrestors 1a and 3 at the moment of partial separation of the contacts.

As shown in Fig. 4, the breaking capacity can be improved by means of conducting rings 28 distributed along the length of the tube 24, which may be in several parts.

The original arc is thus split-up into a certain number of elementary arcs $27a, 27b, 27c, \ldots$, each having a smaller tension, which makes it easier to extinguish them.

In addition, it is an advantage that the extinguishing effect by the oil does not begin as soon as the arc is struck, that is to say when this latter is of short length. It is preferable that the action of the oil begins only when the arc has become slightly extended and, in consequence, has become weaker. To this end, as shown in Fig. 4, a zone $a$, not provided with orifices, may be formed on the tube 24 in the vicinity of the arc-arrester 1a.

In the alternative form of construction shown in Figs. 5 and 6, the operation of closure of the circuit-breaker is effected by hydraulic control. The tube 1 is provided at its lower extremity with a normally open valve 60 pierced with a small conduit 60a and subjected to the action of a spring 61 which tends to open the valve. The chamber 12 is connected by a conduit 62 to a reserve of oil 62a under pressure, comprising a valve 62b. The nipples 1b which are carried on the tube 1 through the intermediary of a collar, project externally through the lateral openings 15a of the central part 15. On these nipples are attached the extremities of two springs 63, the other extremities of which are fixed to the lower portion of the chamber 12. In the position shown, which is the closed position of the circuit-breaker, the springs 63 are under tension.

The maintenance of this tension is ensured by rocking lateral hooks 64 (see Fig. 6) carried by trunnions 64a fixed to the tubular body of the device, these hooks being arranged for actuation by an external control, operated for example by an electro-magnet or a hydraulic jack 65 which serves as a release device.

The operation of the circuit-breaker is as follows:

The valve 62b being closed, when the hooks 64 free the nipples 1b the springs 63 pull sharply on the tube 1 from the top towards the bottom. The circuit-breaker opens, oil passing from the chamber 12 to the break-chamber 7, since the valve 60 is open. This valve closes at the end of its travel by contact with the bottom of the chamber 12, due to the fact that the springs 63 have, even in the unstressed state, greater strength than that of the spring 61.

In order to engage the circuit-breaker, the valve 62b is abruptly opened, thus putting the chamber 12 in communication with the reservoir 62a of oil under pressure. As the pressure of the oil is sufficient to overcome the pressure of the springs 63, the oil passing into the chamber 12 forces the tube upwards, since the valve 60 remains closed under the effect of that pressure.

As soon as the hooks 64 have come into engagement with the nipple 1b, the valve 62b is re-closed and the valve 60 opens by virtue of the small conduit 60a which enables the pressures between the chambers 7 and 12 to be equalised.

During the upward movement of the moving contact 1, part of the oil in the chamber 7 has been forced out by the valve 8, which has expelled the partially-burnt oil in this chamber through the opening of the circuit-breaker. However, when the valve 60 is open, it is possible to renew the oil in the chamber 7 completely by again opening slightly the valve 62b. For the evacuation of the used oil, it is possible to provide a special small orifice 7a which provides a communication of the chamber 7 with the exterior on the side opposite to the extremity of the tube 1, so as to ensure the sweeping-out of all the used oil by fresh oil.

By virtue of this possibility of renewing the oil, it is possible to give a minimum volume to the break-chamber 7, contrary to the circuit-breaker devices of known types which must contain a large quantity of oil, since the oil which is burnt at each break remains inside the apparatus. There are thus gained advantages in lightness, overall size and production cost.

The circuit-breaker which has just been described may be employed separately, in series with an isolating-switch of the usual type. However, by reason of its lightness and of its elongated form, it is especially suited to form the moving arm of an isolating switch.

Fig. 7 shows a circuit-breaker isolating-switch of this kind, for a high tension line for example.

An apparatus of this kind is mounted on top of a support 100, a pylon for example, on a plate 100a. It comprises a number of arms equal to that of the line conductors, for example three in the case of a three-phase line. Each of the arms pivots on an insulating column 101, which is preferably tubular to permit the passage of the hydraulic conduits and also when so required for the housing of the current transformers supplying the release relays of the apparatus, and rests on the column 102 which serves as a support for a fixed contact bar 103 to which is connected one extremity of a line conductor 104. The column 101 carries a plate 105 provided with two vertical cheeks 106, between which is pivoted about an axis 107, a circuit-breaker 108 of the kind described with reference to Figs. 5 and 6. This circuit-breaker is shown diagrammatically by its metallic portion 108a containing the chamber 12 and provided with the longitudinal apertures 15a, and its insulating portion 108b containing the chamber 7. The sliding contact 21 contained in the metal portion 108a and with which the moving tube is in permanent contact, is connected by a flexible plaited conductor 109 to the line conductor 109a fixed to the plate 105 by the stay 109b.

The fixed contact 2 arranged at the extremity of the insulating part 108b is coupled by the conducting plug 23 to a contact blade 110. In the position shown, this blade rests on the contact 103. The conductors 109a and 104 are thus connected through the isolating switch circuit-breaker combination.

The springs 63, fixed at one extremity of the nipples 1b of the moving contact tube, are fixed at their other extremities to the rear portion of the tube 108. The springs 63 are kept under tension in the position shown by means of a knuckle-joint, the two parts 111a and 111b are articulated to each other at 112. The part 111a is pivoted on the cheeks 106 by a spindle 113 located above the axis 107, whilst the part 111b is pivoted on the nipples 1b.

In the position shown, the two parts 111a and 111b have gone beyond the alignment, indicated by the chain-dotted line D in Fig. 7a, connecting the centers of the shafts 113 and 1b, so that the shaft 112 is slightly below that alignment. Light springs 112a tend to maintain the two parts 111a and 111b in this bent position. However, the angle formed by these two parts is limited by the variable stop member 114 rigidly fixed to the part 111a, which is supported on the cross member 111c connecting the two branches which form the part 111b (see Fig. 7a). The knuckle-joint is thus in the braced condition.

In said braced condition, the fully extended knuckle-joint 111a—111b is rigid and the stretched springs 63 connected on the one hand to the sliding tube 1 owing to the nipples 1b and on the other hand to the nipples 12a, i.e. very near of the spindle 107, draws the arm 108 downwards about the axis 107. The couple drawing downwards the arm 108 is substantially equal to the product of the force of the springs 63 by the distance of said springs to the spindle 113.

Conversely, one or a number of springs 115 are fixed at one extremity to the base-plate 105 and by the other extremity to the lug 116 of the part 108a below the pivot 107. With respect to the pivot 107 which forms the articulation of the arm 108, these springs apply a couple substantially equal to the product of the force of said springs 115 by the distance thereof to the axis 107 which tends to lift this arm. This second lifting couple is substantially smaller than the former pushing the arm 108 downwards, so that the arm 108 remains in closed position, i.e. with the blade 110 in contact with the transverse bar 103 as long as the knuckle-joint remains rigid.

In the vicinity of the shaft 113, the part 111a carried a nipple 126 which is eccentric with respect to the shaft 113 (see Fig. 7a), on which is supported a lever 117 pivoted about this same pivotal shaft 113. On the free extremity of this lever is adapted to act the release member, for example a hydraulic jack 118 supplied through a conduit 119.

Thus the lever 117, pivoting about the axis 113, can move the part 111a, through the intermediary of the nipple 126, through an angle sufficient for the pivot 112 of the knuckle-joint to pass above the straight line D connecting the pivots 113 and 1b (see Fig. 7a).

Thus, when the device is in the active position shown in Fig. 7, a thrust of the jack 118 on the lever 117 initiates the bending of the knuckle-joint, so that the spring 63 is free to contract and carries with it the tube-contact 1; the recoil movement of this tube causes the complete bending of the knuckle-joint. Said knuckle-joint being no more rigid, it can no longer transmit to the moving arm 108 the closure couple due to the spring 63, and this arm, subjected to the couple of the springs 115 only, lifts and separates the blade 110 from the contact 103. Finally, the device takes up the position shown in chain-dotted lines.

In these operations, the opening of the circuit-breaker has preceded the opening of the isolating-switch.

Conversely, for the re-setting of the device, the procedure is as indicated with reference to Figs. 5 and 6.

Oil under high pressure is sent through the conduit 62 into the reserve chamber. The oil pressure pushes back the internal tube, tensions the springs 63 and straightens the knuckle-joint which takes up the aligned position and owing to the springs 112a goes beyond said position and becomes rigid. However, as long as a high pressure exists in the reserve chamber 12, the arm remains in the raised position. The supply of oil under pressure is then cut-off in the conduit 62. By virtue of the leakage produced by the conduit 60a (see Fig. 5), the pressure falls in the reserve chamber, and the valve 60 opens; at this moment, the spring 63 applies a tractive pull on the nipples 1b and, in consequence, on the straightened knuckle-joint, which causes the arm and the knuckle-joint to pivot into the closed position. The closure operation corresponds to a slight shortening of the stretched spring 63, which provides the energy for closure and forces a small quantity of oil into the chamber 7.

During closure therefore, the circuit-breaker is first of all closed and then the arm 108 closes with an abrupt movement which depends on the amount of the travel of partial shortening of the springs 63, that is to say on the distance which separates the pivots 107 and 113.

In the alternative form of construction shown in Fig. 8, the two springs 63 are replaced by a single spring 163, one extremity of which is fixed to a collar 164, which slides on the metal portion 108a, in which collar the nipples 1b rigidly fixed to the tube 1 are engaged. The other extremity of this spring is directly fixed to the part 108a in the vicinity of the pivotal axis 107 of this part on the cheeks 106.

The use of a spring 163 coaxial with the arm and fixed on the part 108a enables in particular this arm to be conveniently enclosed by a flexible sleeve 165, which, in the position of use, prevents the accidental closing of the slots 15a of the part 108a, by snow for example, and by dirt on the part of the tube 1 in contact with air, which might interfere with the working of the device. A second flexible sleeve 166, preferably of highly insulating material such as synthetic rubber, fixed at its extremities on the insulating portion 108b and on the collar 164, also closed these slots 15a when the apparatus has operated. This second sleeve has the further advantage of lengthening, in the same way as insulator ribs, the leakage path over the exterior of the insulating portion 108b and of increasing, after opening, the distance which separates the parts 23 and 108a under voltage.

In the construction shown in Fig. 9, the knuckle-joint shown in Figs. 7 and 7a is replaced by two tubes 167 and 168 sliding one inside the other. The tube 167 is articulated at its extremity in the fork 164a rigidly fixed to the collar 164 and the tube 168, as before, on the pivots 113. The tube 167 (see Fig. 9) comprises a fixed sleeve 169 on the side opposite to the collar 164, this tube and this sleeve being pierced with cylindrical holes for receiving balls 170.

In the extended position of the tubes 167 and 168 shown in Fig. 9, these balls are supported on the extremity of the tube 168 which comprises a conical supporting ramp 168a for these balls. The balls which, under the thrust of the spring 163, tend to be driven towards the interior of the sleeve, are held in position by the cylinder 171. In addition, the balls are prevented from escaping to the exterior by the sleeve 172 rigidly fixed on the extremity of the tube 168. This sleeve also ensures the guiding of the sliding movement of the tubes 167 and 168 one inside the other, and in the position shown, it stiffens the tubes 167 and 168, preventing them from buckling under the thrust of the spring 163.

The cylinder 171 comprises the conical ramp 171a and the shoulder 171b, and it is rigidly fixed to a tube 173 which terminates in the shouldered plug 174 on which the spring 175 acts. The release jack 118, shown in the form of a bellows, acts in the opposite direction to the spring 175.

When oil under pressure is sent into the bellows, the latter push back the plug 174, the tube 173 and the cylinder 171 towards the right hand side of Fig. 1, so that the balls 170 come opposite the tube 173, which enables the sloping ramp 168a to drive the balls towards the interior of the sleeve, under the thrust of the spring 163. The sliding tubes are then released and the collar 164 guiding the sliding action on the portion 108a, the tube 167 slides into the tube 168. During this movement, the tube 173 prevents the ball 170 from escaping from the drilled holes in which they are housed.

The extensible element formed by the tubes 167 and 168 having shortened, the release of the circuit-breaker is obtained in the manner previously indicated by the shortening of the spring 163, followed by the lifting of the arm by the springs 115. The length of the extensible element in its shortened state being substantially half its length when extended, the arm 108a and 108b pivots through about 45°.

In order to re-set the device, the procedure, as has already been indicated, is to send oil under pressure into the conduit 62 in order to tension the spring 163. In this movement of extension, the tube 167 slides out of the tube 168. At the moment when the conical ramp 171a comes into contact with the balls, the latter are not yet opposite the extremity of the tube 168. The balls driven by the tube 167 and prevented from moving away by the tube 168 thus drive the cylinder 171 and compress the spring 175. As soon as the balls arrive opposite the extremity of the tube 168, they are forced towards the exterior by the sloping ramp 171a under the tractive pull of the spring 175, which forces the cylinder 171 to engage between the balls, the expansion movement of the spring being limited by the shoulder 171b.

This device with sliding tubes has the advantage, as compared with the knuckle-joint device, that it requires only a very small force for its release, while it is always relatively difficult to cause the knuckle-joint to pass through its dead centre position (in alignment). In addition, a device of this kind is practically immune to hoar-frost which can block the articulations of knuckle-joints.

Finally, the tubes sliding one inside the other form a shock-absorber for the expansion of the springs 63 or 163 which brakes the shock at the end of travel of the valve 60 against the bottom of the reserve chamber.

With arms such as those shown in Fig. 5, after the reserve chamber has been put under pressure, the pivotal return movement is obtained at the end of a more or less long time by the leakage which takes place across the valve 60 through the conduit 60a. In addition, as the pressure falls in the chamber 12, the arm moves downwards slowly before the valve 60 is fully open. Finally, and mainly in a distribution network comprising a number of arms 108a—108b in parallel, it is essential that all the arms are closed simultaneously, whilst by means of the leakage conduits 60a, if automatic closure of the arms is obtained at the end of a certain time, it is impossible that this closure shall be simultaneous.

In order to avoid these drawbacks, the conduits 60a are dispensed with and the closure movement of the arms is controlled by a momentary depression produced in the reserve chambers of these arms. It is however desirable that this depression should be effected in a limited space, in order that, if the device is closed on a short-circuit, the oil is not expelled from the reserve chambers which would prevent the effect of extinction of the arc.

An arrangement which enables this result to be obtained is shown in Fig. 10.

In this construction, the limited space necessary for the expansion of the oil contained in the reserve chambers is constituted by one of the chambers of a double-acting oil jack which is utilised, in addition, for the resetting of a supply device for the release jacks 118.

In Fig. 10, the column 101 which serves as a support for a device, comprises an inner chamber 101a filled with oil and providing a passage for piping systems made from insulating material such as glass fabric impregnated with resins. One of these piping systems 62 provides, as already indicated, for the intake of oil under pressure to the various reserve chambers 12 (the other chambers being supplied by the branch 62₁). The second piping system 119 serves to lead the oil to the release jacks 118, of which one only has been shown. The third 156 is coupled to the overflow evacuation orifice 7a (see Fig. 5) of the break-chamber 7. A small reservoir 141 having a visible level and located above the column 101, serves to compensate for possible leakages from the chamber 101a, and permits the free expansion of the oil in this latter chamber.

The control members of all the arms in parallel comprise an oil reservoir 142 which supplies a pump 142a intended to put the conduit 62 under pressure through the medium of a non-return valve 143 and a pressure-limiting valve 178 comprising a return conduit 178a to the reservoir. On the conduit 62 of each arm, there is also provided a throttling device 179 to limit and regulate the speed of passage of the oil through this conduit.

A rotary distributor 144 with four channels enables these channels to be inter-connected in pairs and is coupled to the conduit 62 by a branch 162.

The channel which is diametrically-opposite to that in which the conduit 162 terminates, returns to the reservoir 142 by the conduit 145a, whilst the two other channels, arranged in the distributor at right angles to the first two, are coupled by the conduits 145b and 145c respectively to the upper part and to the lower part of the double-acting jack 145. The distributor thus enables the two chambers of the jack 145 to be put under pressure in turn, while the other is on discharge towards the reservoir.

In the position 144a of the distributor (shown in dotted lines) the upper chamber of the jack 145 is under pressure and the lower chamber is on discharge. In the position 144b (full lines), the upper chamber is on discharge and the lower chamber is coupled to the conduit 62. This lower chamber constitutes the expansion volume of the oil compressed in the reserve chamber 12, as will be shown later.

By the arrangement now described, the jack 145 is utilised in addition for the setting of the release device, which has operated when the apparatus has to be reset.

The body of the jack 145 is rigidly fixed to a cylindrical casing 146 terminated at its upper portion by a pump cylinder 147, for example, of the type used for the control of hydraulic brakes. The delivery from this pump is coupled to the conduit 119, and oil is supplied to it from the chamber 101a by the conduit 153, so that the reservoir 141 supplies both the chamber 101a and the pump 147 at the same time.

The piston 147a of the pump 147 is coupled by a rod 148 to a piston 149 which slides in the casing 146. The travel of this piston is limited by the nipples 149a which slide in the ports 146a formed in the said casing.

The rod 177b of the piston 177a of the jack 145 has passing through it at its upper extremity the rod 150, the extremities of which are engaged in two longitudinal ports 149b of the piston 149. Between the rod 150 and the body of the jack 145 is compressed a spring 151. A second spring 152 is compressed between a collet 149c rigidly fixed to the base of the piston 149 and the body of the jack 145.

The piston 149 is normally prevented from moving to actuate the pump 147 under the thrust of the spring 152, by a locking finger 159 held in position by a spring, which can be freed by the attraction of a winding 159a excited by the main current, for example through the intermediary of the usual current transformers (not shown), or which can be controlled in any desired manner by hand when it is desired intentionally to release the device. Finally, in the casing 146 is arranged a ring 160, the position of which can be varied by means of a stop-screw 160a. This ring acts through the rod 150 to limit the upward travel of the piston 177a, that is to say the volume of the lower chamber of the jack which serves as the oil expansion volume of the reserve chambers.

The overflow pipe 156 of the break-chamber is coupled to a small reservoir 157 for recovery of excess used oil, through the medium of a pressure-limiting valve 158 adjusted in such manner that its operating pressure is slightly less than that which corresponds to the setting of the closure valve 8 of the break-chambers 7.

The method of operation of the device shown in Fig. 10 is as follows:

The device being in the released position, that is to say the moving contact 1 being brought back by the spring 163 into its extreme rear position, and the circuit-breaker assembly being swung out into the open position, the distributor is put into the position 144a and the pump 142a is set in operation.

The oil under pressure arrives on the one hand through the conduit 62 into the chambers 12 and on the other hand through the conduit 162 and the distributor into the upper chamber of the jack 145, the pistons 177a and 149 being both in their upper position.

As previously indicated, the valve 60 being closed in the released position by the residual force of the main spring 163, the inner tube 1 moves against the pressure of this spring 163, causing the extension of the knuckle-joint or the sliding tubes 167 and 168.

All the circuit-breakers close, the arms remaining raised, since the valve 60 is no longer provided with the leakage conduit 60a.

During this operation of closure of the circuit-breaker, the piston 177a moves down, the oil in the lower chamber being sent to the reservoir through the conduits 145c and 145a. The springs 151 and 152 of the piston are successively compressed by the rod 150 and then by the collet 149c, as and when the piston 177a moves downwards. As the piston 149 moves down, the latch 159 is pushed by its spring to lock this piston in its lower position.

At the end of these operations, the release pump 147 is set: the circuit-breakers inside the arms 108a–108b are closed; these arms however remain in their upper position.

In order to swing them downwards so that the blades 110 are applied against the contacts 103, the rotary distributor 144 is set abruptly to the position 144b, such that a communication is established through the conduits 145c, 162 and 62 between the lower chamber of the jack 145 and the chambers 12 of the arms, the upper chamber of this jack being put to exhaust to the reservoir 142 through the conduits 145a and 145b.

As the pressure falls sharply in the chambers 12, the valves 60 open fully and the arms swing down into the position of closure.

The volume of the lower chamber of the jack is determined in such manner that it corresponds as precisely as possible to the expansion of the oil contained in the whole of the circuit, and to the volume of oil delivered by the return movement of small amplitude of the moving contact 1 during the rocking movement of the arms which is produced, in the manner already indicated, by the shortening of the springs 63 or 163 supported on the extensible member (111a—111b or 167—168) in its position of maximum extension.

The device is thus closed and is ready to open again immediately in the event of it having been closed on a short-circuit.

The valves 60 being open, it is also possible to renew the oil in the break-chambers 7 by continuing to operate the pump 142.

During the swinging-down movement of the arms, the piston 177a rises and the rod 150 becomes freed from the collet 149c, so that the subsequent release (by freeing of the latch 159) is not interfered with by the jack 145. In addition, in case of closure on a short-circuit, the chambers 12 communicating with the closed spaced formed by the lower chamber of the jack 145 are isolated, so that the circuit-breaker can operate immediately.

In accordance with the method of operation which has just been indicated, the closure of the device takes place in two stages. During the course of the first stage, the moving contact 1 is first put in contact in oil with the fixed contact 2 and then the rapid closure of the arms takes place in air at a speed which is independent of the operator, and which depends on the one hand on the excess of the closure couple (spring 63) with respect to the opening couple (springs 115), and on the other hand on the speed of circulation of the oil through the throttling device 179.

The release controlled by the freeing of the latches 159 is caused by the jack 118 which receives oil from the pump 147. The circuit-breakers inside the arms open and then the arms open due to the effect of the springs 115.

The opening in air is however completed at the end of a very short time after the break in oil, so that the break-chambers are thus not subjected to a voltage between their two extremities, except for a negligible time.

It is thus possible to form the parts 108b by using materials of average insulating properties, such as glass fabric impregnated with synthetic resin, whilst if the extremities of the break-chamber remained permanently under voltage, it would be necessary to use insulators of very high quality such as glass or porcelain.

What I claim is:

1. A circuit-breaker comprising an elongated tubular casing having an insulating front portion, open towards the front, and a metallic rear portion, having a back closure, having a length at least double that of the said insulating front portion and at least one longitudinal opening in its front part in the vicinity of the said insulating portion; a fixed contact closing the front end of the said insulating portion and having an inner tubular portion provided with an outwardly opening aperture; a spring valve closing said aperture and adapted to open under the action of a pressure directed from the interior of the casing towards the exterior; a tubular moving contact adapted to make a to-and-fro movement in the direction of the length of said casing, arranged coaxially with respect to said tubular portion of the fixed contact, and of length substantially equal to that of the metallic rear portion and adapted to co-operate internally with the said tubular portion; a first perforated partition adapted to close the said insulating portion on the rear side of the insulating portion and to permit a fluid-tight longitudinal sliding movement of the said tubular moving contact in the said perforation; a second perforated partition adapted to close the rear part of the said metallic portion beyond the part thereof provided with said longitudinal opening and forwards said back closure and to permit a longitudinal fluid-tight sliding movement of the said tubular moving contact; oil imprisoned in the said insulating portion, in the rear part of the said metallic portion and in the interior of the said tubular moving contact; mechanical means coupled to the said tubular moving contact through at least one of the said longitudinal openings of the metallic portion for displacing the said tubular contact at least towards the rear, in the direction which moves it away from the said fixed contact; electric connection means for coupling the fixed contact to one extremity of an exterior electrical conductor; and sliding electrical connection means for connecting the said moving tubular contact in all its positions to one extremity of a second external conductor.

2. A circuit-breaker as claimed in claim 1, comprising in addition, at the front extremity of the tubular moving contact co-operating with the fixed contact, means for laterally spreading-out the oil passing through said tubular moving contact in the vicinity of said fixed contact, when the said moving contact is displaced towards the rear.

3. A circuit-breaker as claimed in claim 2, in which the said spreading means for the oil comprises an insulating poppet-valve arranged at the front extremity of the moving tubular contact, and a spring acting on the said valve in the direction of closure of the said front extremity.

4. A circuit-breaker as claimed in claim 2, in which the means for spreading out the oil comprise an insulating tubular extension of the moving tubular contact pierced with peripheral openings, and a conducting plug closing the said extension at its extremity which is turned towards the fixed contact.

5. A circuit-breaker as claimed in claim 4, in which the openings are slots substantially perpendicular to the axis of the tubular extension, arranged in staggered relation at the periphery of the said extension and overlapping each other in the direction of the length of the tubular extension.

6. A circuit-breaker as claimed in claim 5, in which the slots are oblique to the radial direction, the obliquities being in the opposite direction for two adjacent series of slots in the direction of the length of the tubular extension.

7. A circuit-breaker as claimed in claim 5, in which the slots of the central part of the tubular extension are substantially perpendicular to the axis of the said extension, whilst the slots located on each side of the said central part are oblique with respect to the said axis and are divergent with respect to the said central slots.

8. A circuit-breaker as claimed in claim 4, in which the openings of the insulating tubular extension are spaced apart from the extremity of the tubular moving contact.

9. A circuit-breaker as claimed in claim 2, in which the means for spreading out the oil comprise a series of insulating tubular extensions of the tubular moving contact having peripheral openings; conducting rings between two consecutive insulating extensions; and a conducting plug closing the insulating extension farthest away from the tubular moving contact.

10. A circuit-breaker as claimed in claim 1, in which the mechanical means coupled to the said moving contact comprise nipples fixed perpendicularly to the said moving contact and passing through at least two longitudinal openings which face each other; at least one tension spring in parallel relationship with said casing secured at one end to said nipples and at the other end to the rear part of the said casing; locking means co-operating with the said nipples for maintaining the said spring in the stretched position; means for liberating the said locking means; and further comprising a normally open poppet-valve adapted to close the rear extremity of the tubular contact; a spring of lower strength than the said tension spring adapted to open said valve; and means for supplying oil under pressure into the said rear portion of the metallic part of the casing, the lengths of the said longitudinal openings being sufficient to permit the contact of the said valve with the said back closure of the said metallic part of the casing for closing said valve, in the retracted position of the said tension spring.

11. A circuit-breaker as claimed in claim 10, in which the said valve is provided with a restricted oil passage.

12. An electric circuit-breaker isolating-switch combination comprising at least one elongated tubular casing having an insulating front portion open towards the front, and a metallic rear portion having a back closure, the said rear portion having a length substantially double that of the said front portion and facing longitudinal openings in the front part of said rear portion extending from the vicinity of the said insulating portion and having a length substantially equal to that of said insulating portion; a fixed contact closing the front end of the said insulating portion projection with respect to the said portion and having an inner tubular portion provided with an outwardly opening aperture; a spring valve closing said aperture, and adapted to open under the action of a pressure directed from the inside of the casing towards the outside; a tubular moving contact arranged coaxially in the said casing and adapted to make a to-and-fro movement in the said casing between a set position, in which the front portion of the said contact is engaged in the tubular portion of said fixed contact, and a retracted position in which the rear part of the said contact comes into immediate proximity to the back closure of the rear portion; a first perforated partition adapted to close rearwardly the said insulating portion and to permit a fluid-tight longitudinal sliding movement of the tubular moving contact; a second perforated partition adapted to close, the rear portion of the said metallic part closely beyond said longitudinal openings, and to permit a fluid-tight longitudinal sliding movement of the said tubular moving contact; oil trapped in the said insulating part, in the rear part of the said metallic portion and in the interior of the moving contact; means for spreading-out laterally the oil discharged from the front extremity of the said moving contact; a normally open spring poppet-valve adapted to close the rear extremity of the said moving contact and to be applied for closure thereof, against the said back closure when the said moving contact is in the retracted position; nipples fixed perpendicularly to the said moving contact and passing through said longitudinal openings; at least one tension spring in parallel relationship with said casing secured at one end to said nipples and at the other end to said casing towards the rear thereof; vertical insulating supporting means for the rear part of the casing; comprising pivoting means coupling the said support means and the said casing, and defining a pivotal axis for the said casing horizontal and at right angles to the axis thereof; further vertical insulating support means separated from the first by a distance substantially equal to the length of the said casing; a conducting member carried by the said further support means, adapted to receive the projecting extremity of the said fixed contact at the end of a downward movement of the casing about its pivotal support means; a member having a variable length between its extremities, one of the said extremities being pivotally carried by the said first support means, above the pivotal axis of the casing on the said support means, and the other being pivotally coupled to the said nipples, the said member being of maximum length when the moving contact is in its set position; locking means for maintaining the said member in a rigid state in its position of maximum length; releasing means enabling the said locking means to be freed and consequently permitting the shortening of the said member of variable length; spring means acting between the first support means and the said casing for upwardly moving said casing, the said means supplying about the pivotal axis of the casing, a couple smaller than that which is downwardly supplied in the opposite direction by the said tension spring acting on the member of variable length in the rigid state; means for supplying oil under pressure into the said rear portion of the casing means for providing a drop of oil pressure in said rear portion; electric coupling means between the said conducting member and an external conductor; sliding electric contact means between the metallic portion of the casing and the tubular moving contact in all the positions thereof; and electric coupling means between the metallic portion of the casing and a further external conductor.

13. A combined circuit-breaker and isolating-switch as claimed in claim 12, in which the said member of variable length is toggle-means movable between an angular position and a position in which the axes of the said toggle means have gone beyond the alignment and in which the locking-release means comprise a lever pivoting on the said first support means and acting on the said toggle-means in the direction which gives it an angular position, and means for causing the said lever to pivot under an external force.

14. A combined circuit-breaker and isolating-switch as claimed in claim 12, in which the said tension spring is concentric with the tubular casing and surrounds the said casing, further comprising a distortable insulating sleeve surrounding the said spring and tightly secured to the said nipples and to the rear part of the casing, and a second distortable insulating sleeve surrounding the said casing towards the front thereof and tightly secured to the said nipples and the insulating portion of the said casing.

15. A combined circuit-breaker and isolating-switch as claimed in claim 12, in which the member of variable length comprises two tubes sliding one in the other, and in which the locking means comprise spring-controlled latches adapted to lock the tubes in the vicinity of their position of maximum extension, and means for retracting the said latches under an external force.

16. A combined circuit-breaker and isolating-switch as claimed in claim 12, in which the said locking-release means comprise a hydraulic jack; a pump for supplying the said jack; a spring acting on the said pump; and means controlled in dependence on the intensity of the current passing through the circuit-breaker isolating-switch for liberating the force of the said spring.

17. A combined circuit-breaker and isolating-switch as claimed in claim 12, comprising in addition, in parallel with the said means for conveying oil under pressure into the rear portion of the casing, valve means and a chamber of limited volume adapted to be put into communication with the rear portion of the casing by the said valve means.

18. A combined circuit-breaker and isolating-switch as claimed in claim 12, in which the said means for conveying oil under pressure into the rear portion of the casing comprise an oil reservoir; a pump deriving its supply from the said reservoir; duct means coupling the said pump to the rear portion of the casing; a four-channel distributor adapted to change the channel connections in pairs; a branch conduit coupling one channel of the said distributor to the said duct means; a return to the reservoir coupled to the diametrically-opposite channel of the distributor; a double-acting hydraulic jack; and two conduits respectively coupling the two other channels of the distributor to each of the compartments defined in the jack by the piston thereof.

19. A combined circuit-breaker and isolating-switch as claimed in claim 18, comprising in addition, a member sliding coaxially with the said jack; lost-motion devices coupling the piston of the said jack to the said sliding member; spring means acting between the said jack and the said sliding member; locking means releasable by an external force for maintaining the said sliding member in a position in which the said spring means are compressed; a pump cylinder substantially coaxial with the said sliding member, and having an outlet on the side opposite to the said sliding member; a piston in the said cylinder; linking means between the said piston and the said sliding member; a further reservoir containing oil for keeping the said cylinder filled; and conduit means for coupling the cylinder outlet to the said releasing means of the locking means.

References Cited in the file of this patent

UNITED STATES PATENTS

| 2,111,416 | Balachowsky | Mar. 15, 1938 |

FOREIGN PATENTS

| 516,532 | Great Britain | Jan. 4, 1940 |
| 725,873 | France | Feb. 22, 1932 |
| 749,211 | Great Britain | May 23, 1956 |
| 1,089,147 | France | Sept. 22, 1954 |